(12) United States Patent
Tanaka et al.

(10) Patent No.: US 11,180,328 B2
(45) Date of Patent: Nov. 23, 2021

(54) SHEET STACKING APPARATUS AND SHEET STACKING METHOD

(71) Applicant: KABUSHIKI KAISHA TOSHIBA, Minato-ku (JP)

(72) Inventors: Masayuki Tanaka, Ichikawa (JP); Takahiro Terada, Yokohama (JP); Wataru Nitta, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/784,326

(22) Filed: Feb. 7, 2020

(65) Prior Publication Data

US 2020/0299075 A1 Sep. 24, 2020

(30) Foreign Application Priority Data

Mar. 19, 2019 (JP) .............................. JP2019-050925

(51) Int. Cl.
*B65G 57/10* (2006.01)
*B65G 57/00* (2006.01)

(52) U.S. Cl.
CPC ........... *B65G 57/10* (2013.01); *B65G 57/005* (2013.01)

(58) Field of Classification Search
CPC ...... B65G 57/10; B65G 57/005; B65G 57/02; B65G 57/03; B65G 57/09
USPC ............ 414/788.9, 789.6, 798.8, 790.9, 791, 414/791.2, 792.7
See application file for complete search history.

(56) References Cited

U.S. PATENT DOCUMENTS 3,978,571 A * 9/1976 Orlando ................ H01M 10/14
29/730
9,812,697 B2 11/2017 Koike

FOREIGN PATENT DOCUMENTS

| JP | 60-67327 A | 4/1985 |
| JP | 61-221053 A | 10/1986 |
| JP | 62-175356 A | 8/1987 |
| JP | 3-3836 A | 1/1991 |
| JP | 2014-22325 A | 2/2014 |
| JP | 2014-103054 A | 6/2014 |
| JP | 2017-54587 A | 3/2017 |

* cited by examiner

*Primary Examiner* — Lynn E Schwenning
(74) *Attorney, Agent, or Firm* — Oblon, McClelland, Maier & Neustadt, L.L.P.

(57) ABSTRACT

A sheet stacking apparatus according to an embodiment stacks first and second sheets. The first sheet includes first stacked and non-stacked parts. The second sheet includes second stacked and non-stacked parts. The first and second stacked parts are stacked to overlap in a Z-direction. The apparatus includes a first holding part holding the first sheet and a second holding part holding the second sheet. The first and second holding parts each include a frame part and a supporter. The frame part extends in an X-direction. The supporter supports the sheet in the Z-direction and provided at the frame part. The first and second holding parts are respectively configured to hold the sheets in a state in which movement of the sheets in the X-direction is regulated. The supporter is provided to be able to drop the object by releasing the supporting of the object in the Z-direction.

12 Claims, 12 Drawing Sheets

SHEET STACKING APPARATUS AND SHEET STACKING METHOD

CROSS-REFERENCE TO RELATED APPLICATIONS

This application is based upon and claims the benefit of priority from Japanese Patent Application No. 2019-050925, filed on Mar. 19, 2019; the entire contents of which are incorporated herein by reference.

FIELD

Embodiments described herein relate generally to a sheet stacking apparatus and a sheet stacking method.

BACKGROUND

A stacked body is known in which multiple sheets are stacked (JP-A 2014-22325). It is desirable to suppress the misalignment in the horizontal direction when stacking the sheets in the manufacture of such a stacked body.

DETAILED DESCRIPTION

A sheet stacking apparatus according to an embodiment stacks a first sheet and a second sheet. The first sheet includes a first stacked part and a first non-stacked part. The second sheet includes a second stacked part and a second non-stacked part. The stacking causes the first stacked part and the second stacked part to overlap in a Z-direction aligned with the direction of gravity. The apparatus includes a first holding part and a second holding part. The first holding part holds the first sheet as an object. The second holding part holds the second sheet as an object. The first holding part and the second holding part each include a frame part and a supporter. The frame part extends in an X-direction crossing the Z-direction. The supporter supports the object in the Z-direction and being provided at the frame part. The first holding part and the second holding part are respectively configured to hold the objects in a state in which movement of the objects in the X-direction is regulated. The supporter is provided to be able to drop the object by releasing the supporting of the object in the Z-direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Figure 1:
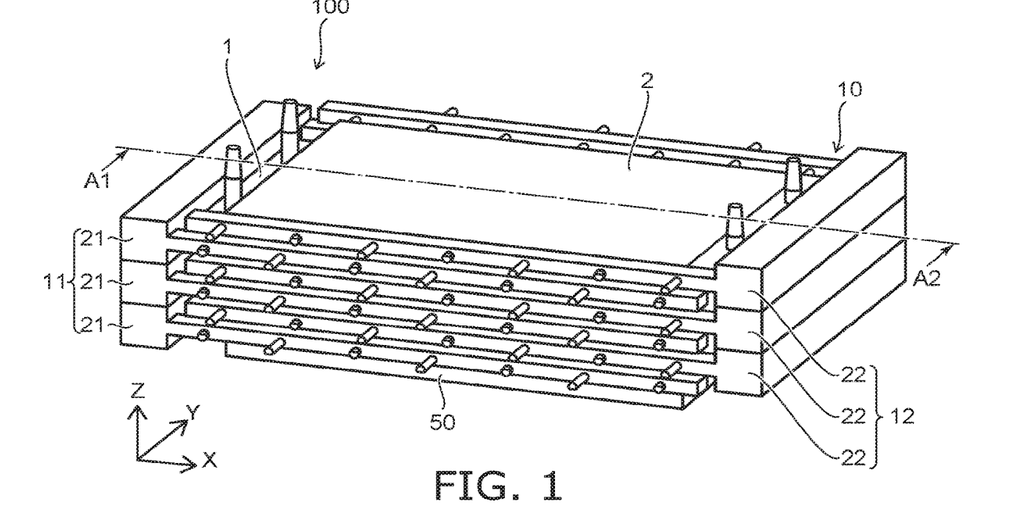
FIG. 1 is a perspective view schematically illustrating a sheet stacking apparatus according to an embodiment.

FIG. 1 is a perspective view schematically illustrating a sheet stacking apparatus according to an embodiment.

Figure 2:
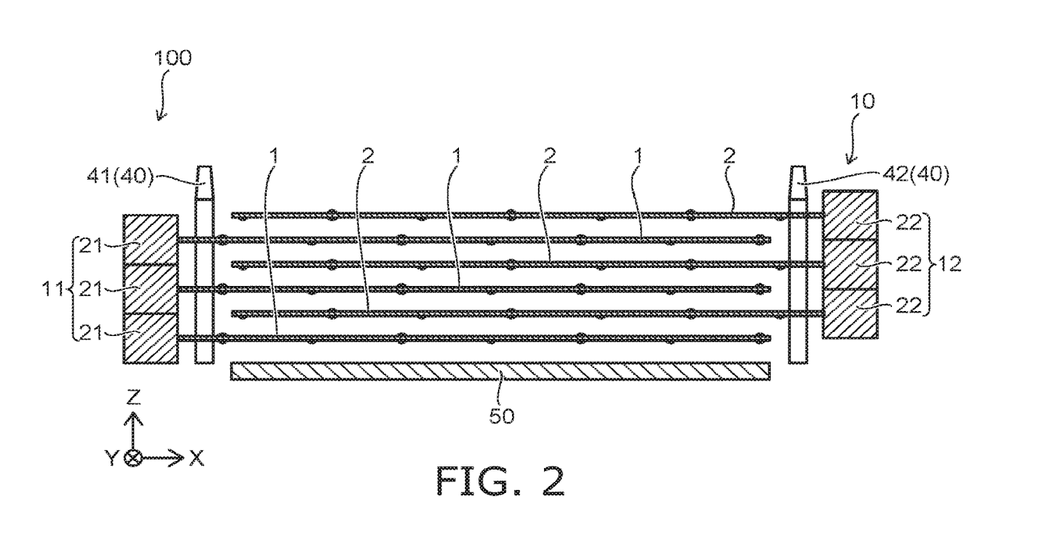
FIG. 2 is a cross-sectional view schematically illustrating the sheet stacking apparatus according to the embodiment.

FIG. 2 is a cross-sectional view schematically illustrating the sheet stacking apparatus according to the embodiment. FIG. 2 is a cross-sectional view along line A1-A2 shown in FIG. 1.

Figure 3A:
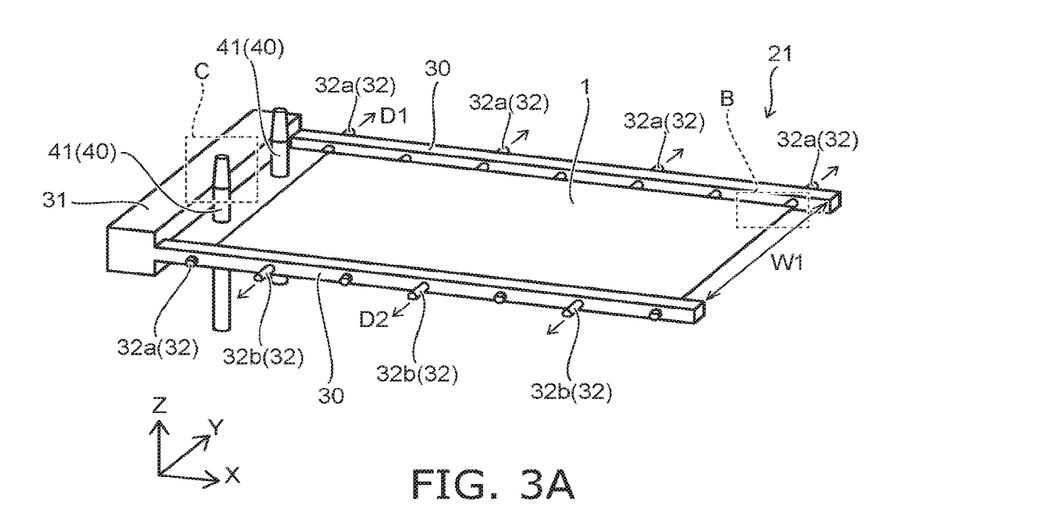
FIG. 3A and FIG. 3B are perspective views schematically illustrating a first holding part and a second holding part according to the embodiment.
Figure 3B:
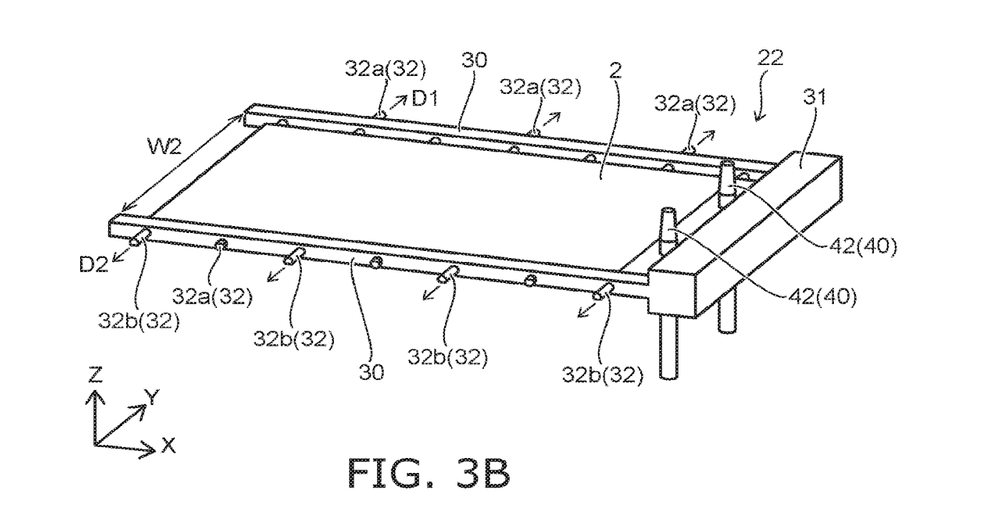

FIG. 3A and FIG. 3B are perspective views schematically illustrating a first holding part and a second holding part according to the embodiment.

Figure 4:
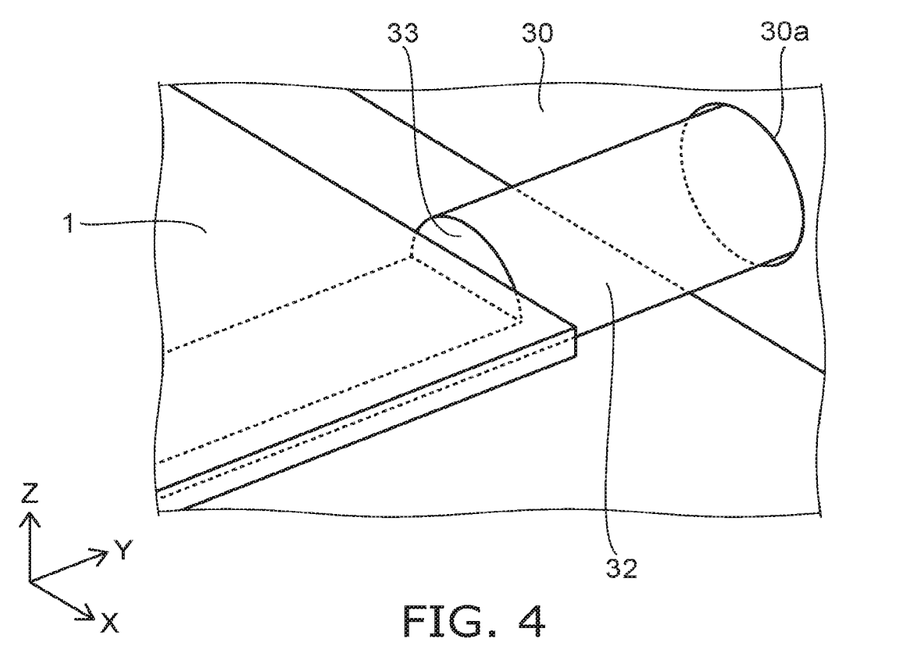
FIG. 4 is an enlarged perspective view schematically illustrating a supporter periphery according to the embodiment.

FIG. 4 is an enlarged perspective view schematically illustrating a supporter periphery according to the embodiment. FIG. 4 is an enlarged view of region B shown in FIG. 3A.

The sheet stacking apparatus 100 according to the embodiment is an apparatus that stacks a first sheet 1 and a second sheet 2 in a Z-direction. As illustrated in FIG. 1 and FIG. 2, the sheet stacking apparatus 100 includes a holder 10 holding the first sheet 1 and the second sheet 2 as objects.

In this specification, a direction along the direction of gravity (i.e., the direction in which the first sheet 1 and the second sheet 2 are stacked) is taken as the Z-direction; a direction that crosses the Z-direction is taken as an X-direction; and a direction that crosses the Z-direction and the X-direction is taken as a Y-direction.

The holder 10 includes the first holding part 21 and the second holding part 22. The first holding part 21 holds the first sheet 1 as an object. The second holding part 22 holds the second sheet 2 as an object. The holder 10 includes at least one first holding part 21 and at least one second holding part 22. The holder 10 holds one first sheet 1 at one first holding part 21. The holder 10 holds one second sheet 2 at one second holding part 22. The first holding part 21 and the second holding part 22 are disposed alternately in the Z-direction. Thereby, the first sheet 1 and the second sheet 2 are disposed alternately in the Z-direction.

In the example, the holder 10 includes the multiple first holding parts 21 and the multiple second holding parts 22. More specifically, the holder 10 includes a first holder 11 which includes the multiple first holding parts 21, and a second holder 12 which includes the multiple second holding parts 22.

Figure 17A:
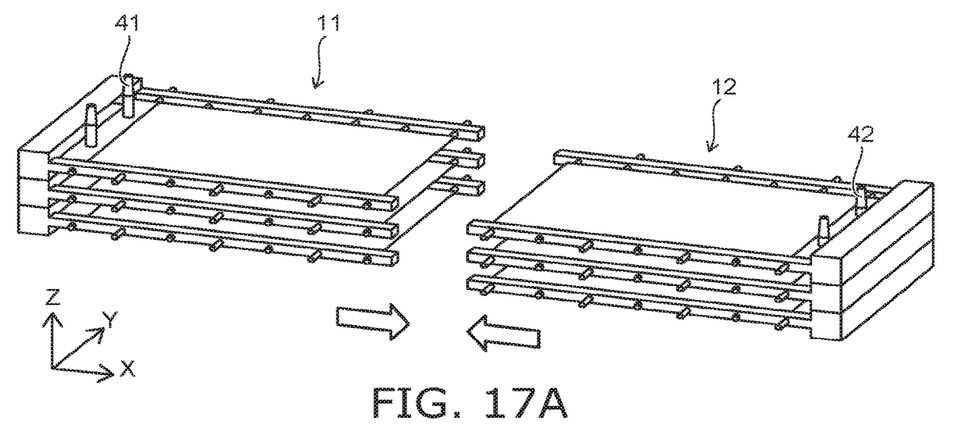
FIG. 17A and FIG. 17B are descriptive views schematically illustrating the sheet stacking method according to the embodiment.
Figure 17B:
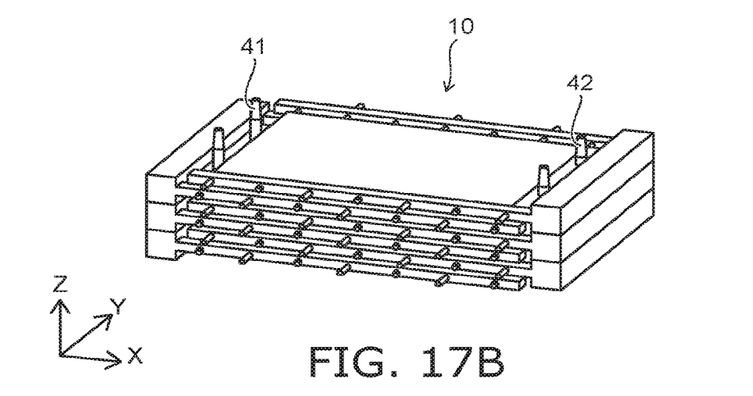
Figure 18A:
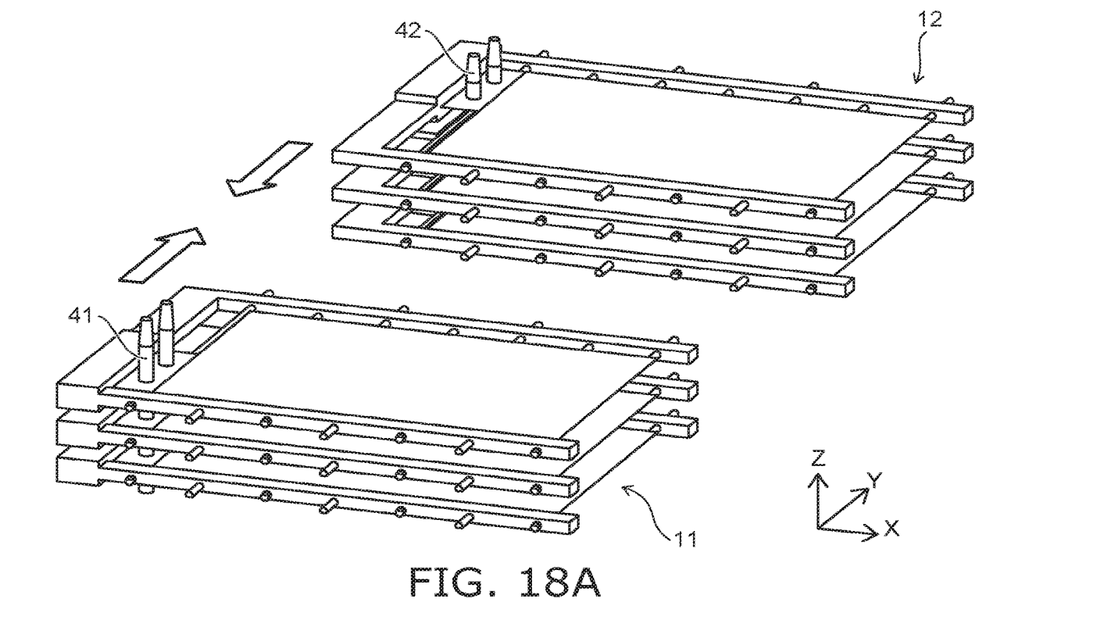
FIG. 18A and FIG. 18B are descriptive views schematically illustrating a modification of the sheet stacking method according to the embodiment.
Figure 18B:
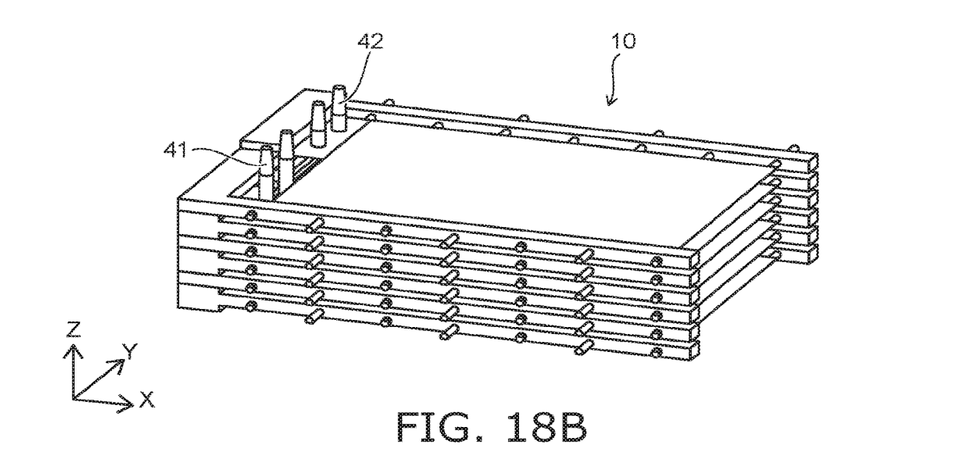

The holder 10 (the first holder 11 and the second holder 12) has a state in which the first holder 11 and the second holder 12 are separated (a first state; referring to FIG. 17A and FIG. 18A), and a state in which the first holding part 21 and the second holding part 22 are combined so that the first holder 11 and the second holder 12 are disposed alternately in the Z-direction (a second state; referring to FIG. 17B and FIG. 18B). The first holder 11 and the second holder 12 are configured to have the first state (the state in which the multiple first holding parts 21 and the multiple second holding parts 22 are separated from each other) and the second state (the state in which the multiple first holding parts 21 and the multiple second holding parts 22 are combined to be disposed alternately in the Z-direction). The sheet stacking apparatus 100 stacks the first sheet 1 and the second sheet 2 in the state in which the first holder 11 and the second holder 12 are combined. The stacking method is described below.

As illustrated in FIG. 3A and FIG. 3B, the first holding part 21 and the second holding part 22 each include a frame part 30 and a supporter 32.

The frame part 30 extends in the X-direction. It is sufficient for the frame part 30 to extend in a direction having at least an X-direction component. In other words, the frame part 30 may not be provided horizontally.

In the example, a pair of frame parts 30 is arranged in the Y-direction. The pair of frame parts 30 each are connected to a connector 31 at one end in the X-direction. The connector 31 extends in the Y-direction. It is sufficient for the connector to extend in a direction having at least a Y-direction component. In other words, the connector 31 may not be provided horizontally.

The first sheet 1 and the second sheet 2 each are disposed in a region surrounded with the pair of frame parts 30 and the connector 31. The connector 31 is provided at one end side in the X-direction for the first sheet 1 and the second sheet 2; and the other end side in the X-direction is not enclosed for the first sheet 1 and the second sheet 2. For example, the first sheet 1 and the second sheet 2 are disposed at the other end sides in the X-direction (i.e., the sides opposite to the connectors 31).

The supporter 32 supports the object (the first sheet 1 or the second sheet 2) in the Z-direction. More specifically, the supporter 32 that is provided in the first holding part 21 supports the first sheet 1 in the Z-direction on the first holding part 21; and the supporter 32 that is provided in the second holding part 22 supports the second sheet 2 in the Z-direction on the second holding part 22. The supporter 32 is provided to pass through the pair of frame parts 30 in the Y-direction.

The supporter 32 is provided in the frame part 30. The supporter 32 is provided to be able to drop the object by releasing the support of the object in the Z-direction by being moved to a position not overlapping the object in the Z-direction. More specifically, the supporter 32 that is provided in the first holding part 21 is provided to be able to drop the first sheet 1 from the first holding part 21 by releasing the support in the Z-direction of the first sheet 1 by being moved to a position not overlapping the first sheet 1 in the Z-direction. The supporter 32 that is provided in the second holding part 22 is provided to be able to drop the second sheet 2 from the second holding part 22 by releasing the support in the Z-direction of the second sheet 2 by being moved to a position not overlapping the second sheet 2 in the Z-direction.

For example, the supporter 32 is provided to be moveable to the position not overlapping the object in the Z-direction by releasing the support of the object (i.e., the first sheet 1 or the second sheet 2) in the Z-direction by being moved in a direction having a Y-direction component. For example, the supporter 32 may be detached from the frame part 30, or may be moved to the position not overlapping the object in the Z-direction without being detached.

For example, multiple supporters 32 are provided at positions overlapping in the X-direction. The supporters 32 include a first supporter 32a and a second supporter 32b. For example, the first supporter 32a and the second supporter 32b are disposed alternately in the X-direction.

The first supporter 32a is movable in a first direction D1 crossing a Z-direction, and particularly in the embodiment, is configured to move linearly. The second supporter 32b is movable in a second direction D2 different from the first direction D1, and particularly in the embodiment, is configured to move linearly. In the example, the first direction D1 is the positive orientation of the Y-direction; and the second direction D2 is the negative orientation of the Y-direction. It is sufficient for the first direction D1 and the second direction D2 to have at least Y-direction components; and the first direction D1 and the second direction D2 may not horizontal. The first direction D1 and the second direction D2 also may have X-direction components.

The holder 10 is configured to hold the objects in a state in which the movement in the X-direction of the objects (the first sheet 1 and the second sheet 2) is regulated. For example, the holder 10 can regulate the movement of the objects in the X-direction by at least one of the connector 31 or a through-part 40 described below.

By regulating the movement in the X-direction of the objects, the holder 10 can align the objects in the X-direction. The misalignment in the horizontal direction when stacking the first sheet 1 and the second sheet 2 can be suppressed thereby.

The holder 10 also is configured to hold the objects in a state in which the movement in the Y-direction of the objects (the first sheet 1 and the second sheet 2) is regulated. For example, the holder 10 can regulate the movement of the objects in the Y-direction by at least one of the frame part 30, a vertical surface 33 of the supporter 32 described below, or the through-part 40 described below.

By regulating the movement of the objects in the Y-direction, the holder 10 can align the objects in the Y-direction. The misalignment in the horizontal direction when stacking the first sheet 1 and the second sheet 2 can be suppressed thereby.

In the example as illustrated in FIG. 4, the supporter 32 has the vertical surface 33 spreading in the X-direction and the Z-direction. The vertical surface 33 is formed of a cross section where a part of the supporter 32 is cut away. The vertical surface 33 regulates the movement of the object in the Y-direction.

As illustrated in FIG. 4, a hole part 30a for inserting the supporter 32 is provided in the frame part 30. The supporter 32 can be held by the frame part 30 by inserting the supporter 32 into the hole part 30a. The supporter 32 can be moved to a position not overlapping the object in the Z-direction by moving the supporter 32 through the hole part 30a.

As illustrated in FIG. 2, the holder 10 further includes the through-part 40 passing through the object (the first sheet 1 or the second sheet 2) in the Z-direction. The through-part 40 regulates the movement of the object in the X-direction and the Y-direction. More specifically, the through-part 40 includes a first through-part 41 passing through the first sheet 1, and a second through-part 42 passing through the second sheet 2. The first through-part 41 regulates the movement of the first sheet 1 in the X-direction and the Y-direction. The second through-part 42 regulates the movement of the second sheet 2 in the X-direction and the Y-direction.

By providing such through-parts 40, the movement of the objects in the X-direction and the Y-direction can be regulated; and the alignment of the objects in the X-direction and the Y-direction can be performed. The misalignment in the horizontal direction when stacking the first sheet 1 and the second sheet 2 can be suppressed thereby.

In the example, two first through-parts 41 and two second through-parts 42 are arranged in the Y-direction. One first through-part 41 and one second through-part 42 may be provided; or three or more first through-parts 41 and three or more second through-parts 42 may be provided. By providing two or more first through-parts 41 and two or more second through-parts 42, the rotation in the X-Y plane of the objects can be regulated.

The sheet stacking apparatus 100 further includes a stage part 50 where the first sheet 1 and the second sheet 2 are stacked. The stage part 50 is provided below the first sheet 1 and the second sheet 2. The stage part 50 has a surface spreading in the X-direction and the Y-direction; and the first sheet 1 and the second sheet 2 are stacked on this surface. For example, the stage part 50 is movable in the Z-direction. The stage part 50 is provided as necessary and is omissible.

Figure 6A:
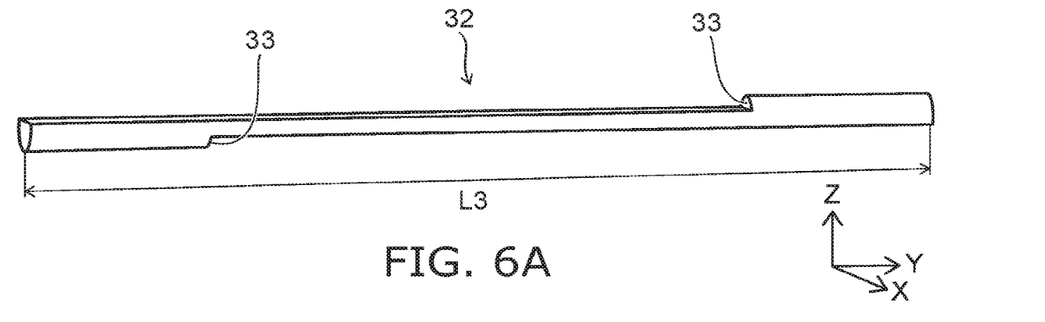
FIG. 6A and FIG. 6B are a perspective view and a plan view schematically illustrating the supporter according to the embodiment.
Figure 6B:
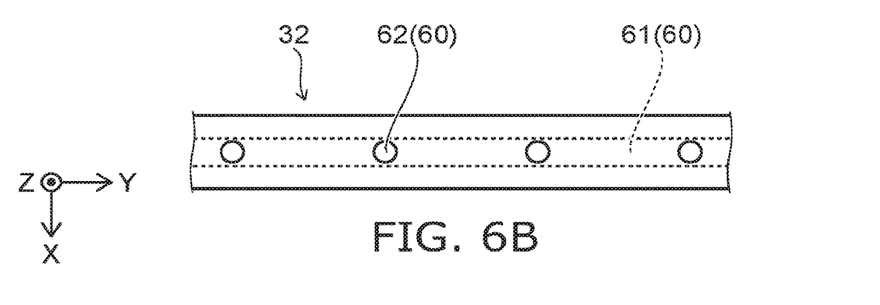

The sheet stacking apparatus 100 may further include an intake/exhaust part 60 configured to intake or exhaust a gas (referring to FIG. 6B). For example, the intake/exhaust part 60 is provided in the supporter 32. The intake/exhaust part 60 may be provided separately from the holder 10. The gas that is suctioned or exhausted by the intake/exhaust part 60 is, for example, air. By providing such an intake/exhaust part 60, the objects (the first sheet 1 and the second sheet 2) can be caused to float or can be held by suction. Sagging of the objects can be eliminated thereby.

Here, the first sheet 1 and the second sheet 2 which are stacked by the sheet stacking apparatus 100 according to the embodiment will be described.

Figure 5A:
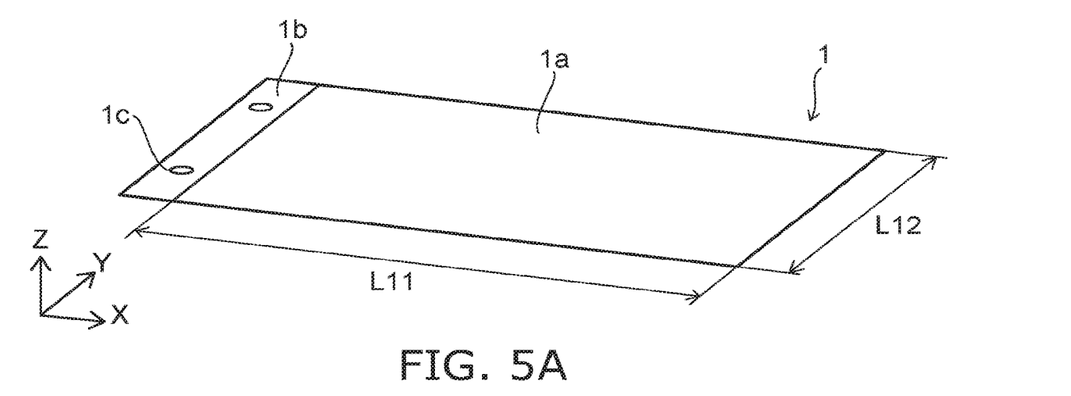
FIG. 5A and FIG. 5B are perspective views schematically illustrating the first sheet and the second sheet.
Figure 5B:
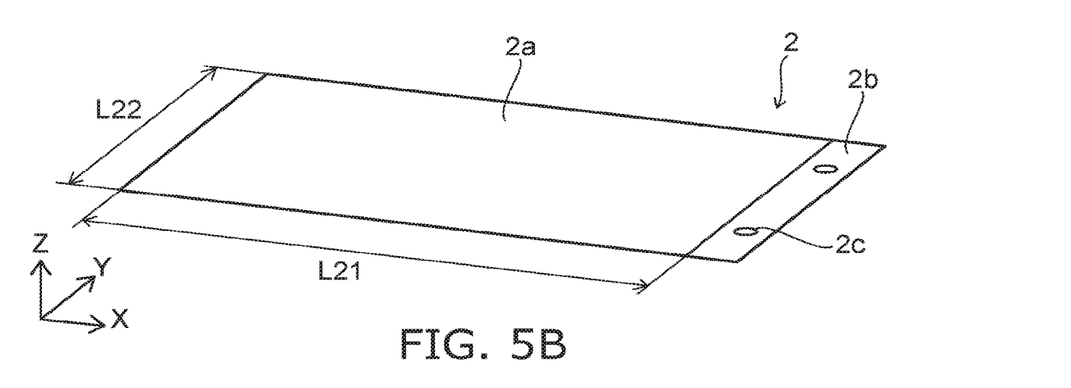

FIG. 5A and FIG. 5B are perspective views schematically illustrating the first sheet and the second sheet.

As illustrated in FIG. 5A and FIG. 5B, for example, the first sheet 1 and the second sheet 2 have quadrilateral configurations when viewed from the Z-direction. In the example, the first sheet 1 and the second sheet 2 have rectangular configurations in which the X-direction is the longitudinal direction and the Y-direction is the transverse direction.

The first sheet 1 includes a first stacked part 1a and a first non-stacked part 1b. The second sheet 2 includes a second stacked part 2a and a second non-stacked part 2b. The first stacked part 1a and the first non-stacked part 1b do not overlap each other in the Z-direction. The second stacked part 2a and the second non-stacked part 2b do not overlap each other in the Z-direction. The first stacked part 1a and the second stacked part 2a are parts where the first sheet 1 and the second sheet 2 overlap in the state in which the first sheet 1 and the second sheet 2 are stacked; and the first non-stacked part 1b and the second non-stacked part 2b are parts where the first sheet 1 and the second sheet 2 do not overlap in the state in which the first sheet 1 and the second sheet 2 are stacked.

That is, in the state in which the first sheet 1 and the second sheet 2 are stacked, the first stacked part 1a overlaps the second stacked part 2a in the Z-direction but does not overlap the second non-stacked part 2b in the Z-direction. In the state in which the first sheet 1 and the second sheet 2 are stacked, the first non-stacked part 1b does not overlap the second stacked part 2a and the second non-stacked part 2b in the Z-direction.

The first through-part 41 is provided to pass through the first non-stacked part 1b in the Z-direction. Therefore, a first hole part 1c for inserting the first through-part 41 is provided in the first non-stacked part 1b. The second through-part 42 is provided to pass through the second non-stacked part 2b in the Z-direction. Therefore, a second hole part 2c for inserting the second through-part 42 is provided in the second non-stacked part 2b.

For example, the second stacked part 2a is larger than the first stacked part 1a. A length L21 in the X-direction of the second stacked part 2a is longer than a length L11 in the X-direction of the first stacked part 1a. Also, a length L22 in the Y-direction of the second stacked part 2a is longer than a length L12 in the Y-direction of the first stacked part 1a. By setting the second stacked part 2a to such a size, the first stacked part 1a can be covered with the second stacked part 2a in the state in which the first sheet 1 and the second sheet 2 are stacked.

When multiple first sheets 1 are stacked, the first stacked parts 1a overlap each other in the Z-direction; and the first non-stacked parts 1b overlap each other in the Z-direction. Also, when multiple second sheets 2 are stacked, the second stacked parts 2a overlap each other in the Z-direction; and the second non-stacked parts 2b overlap each other in the Z-direction.

The first sheet 1 and the second sheet 2 may be single layers or may be multiple layers. That is, the first sheet 1 and the second sheet 2 each may be a sheet-like structural component including multiple stacked layers. Also, parts of the first sheet 1 and the second sheet 2 may be single layers; and other parts of the first sheet 1 and the second sheet 2 may be multiple layers. That is, the first sheet 1 and the second sheet 2 each may include a single-layer part and a multilayer part.

The first sheet 1 is, for example, the positive electrode of a battery; and the second sheet 2 is, for example, the negative electrode of the battery. The sheet stacking apparatus 100 according to the embodiment can be used as a manufacturing apparatus of a battery or the manufacturing apparatus of a sheet electrode stacked body in which sheet-like positive electrodes and sheet-like negative electrodes are stacked. The sheet stacking apparatus 100 according to the embodiment is not limited thereto and can be used as a stacking apparatus stacking sheet-like articles.

FIG. 6A and FIG. 6B are a perspective view and a plan view schematically illustrating the supporter according to the embodiment.

As illustrated in FIG. 6A, the supporter 32 has a circular columnar configuration and is rotatable with the center of a circle as the axis. In the embodiment, for example, the supporter 32 is configured to be moveable linearly in a direction crossing the Z-direction such as the positive direction and/or the negative direction of the Y-axis, etc., and is rotatable with the movement axis of the straight-line movement as the central axis. Even when the supporter 32 is configured not to move linearly, the supporter 32 can be configured to be rotatable with the central axis being the center of the hole part 30a through which the supporter 32 provided in the frame part 30 is inserted. By the supporter 32 having such a configuration, sagging of the object can be eliminated by rotating the supporter 32 in the state in which the object is placed on the supporter 32.

A length L3 in the Y-direction of the supporter 32 is greater than the width between the pair of frame parts 30. More specifically, the length L3 in the Y-direction of the supporter 32 provided in the first holding part 21 is greater than a width W1 between the pair of frame parts 30 of the first holding part 21 (referring to FIG. 3A). Also, the length L3 in the Y-direction of the supporter 32 provided in the second holding part 22 is greater than a width W2 between the pair of frame parts 30 of the second holding part 22 (referring to FIG. 3B).

For example, the supporter 32 has multiple vertical surfaces 33 oriented in different directions. Two vertical surfaces 33 are provided in the example. One of the vertical surfaces 33 is oriented in the positive orientation of the Y-direction; and the other of the vertical surfaces 33 is oriented in the negative orientation of the Y-direction. The two vertical surfaces 33 are provided at positions so that the one of the vertical surfaces 33 and the other of the vertical surfaces 33 do not overlap each other in the Y-direction.

Thus, by providing the multiple vertical surfaces 33 in the supporter 32, the movement of the object in the positive orientation and the negative orientation of the Y-direction can be regulated. That is, the alignment of the two ends of the object in the Y-direction can be performed.

Also, as illustrated in FIG. 6B, for example, the intake/exhaust part 60 is provided in the supporter 32. The intake/exhaust part 60 includes a flow channel 61 allowing a gas to pass through the interior of the supporter 32, and a hole part 62 which communicates with the flow channel 61. The intake/exhaust part 60 can intake or exhaust the gas via the flow channel 61 and the hole part 62.

Figure 7:
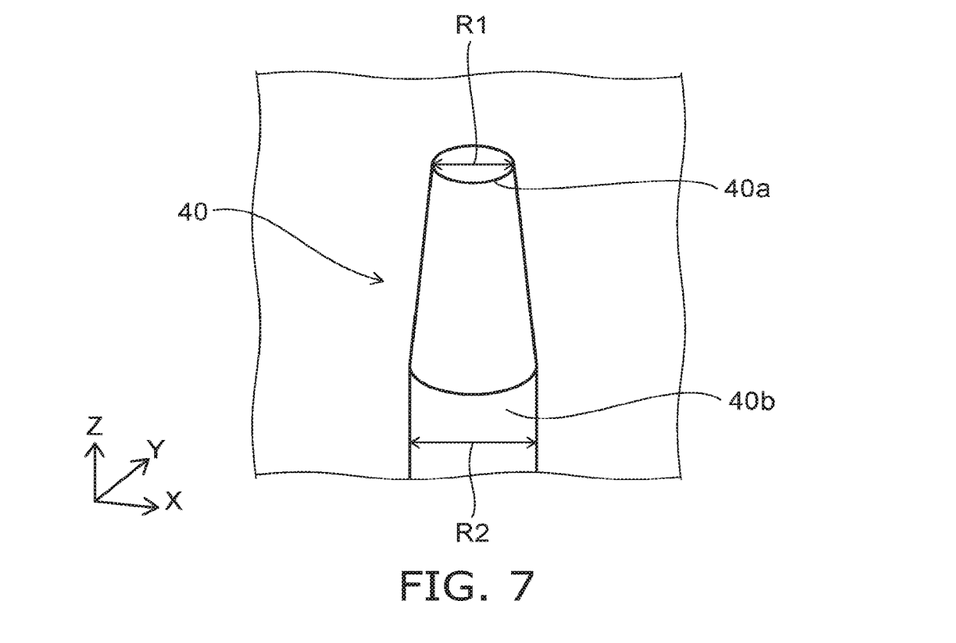
FIG. 7 is an enlarged perspective view schematically illustrating a part of the through-part according to the embodiment.

FIG. 7 is an enlarged perspective view schematically illustrating a part of the through-part according to the embodiment. FIG. 7 is an enlarged view of region C shown in FIG. 3A.

As illustrated in FIG. 7, a diameter R1 of a Z-direction end part 40a of the through-part 40 is smaller than a diameter R2 of a Z-direction central part 40b of the through-part 40. The end part 40a is the end part of the through-part 40 in the positive orientation of the Z-direction. In the example, the through-part 40 has a circular columnar configuration and gradually becomes finer from the central part 40b toward the Z-direction end part 40a. If the through-part 40 has such a configuration, the through-part 40 easily passes through the object.

The through-part 40 is not limited to a circular columnar configuration and may have, for example, a prism configuration. In such a case, the diameter of the circumcircle of the polygon of the end part 40a in a cross section in the X-direction and the Y-direction can be considered to be the diameter R1 of the end part 40a. Similarly, in such a case, the diameter of the circumcircle of the polygon of the central part 40b in the cross section in the X-direction and the Y-direction can be considered to be the diameter R2 of the central part 40b.

FIG. 8 to FIG. 16 are descriptive views schematically illustrating a sheet stacking method according to the embodiment.

In the sheet stacking method according to the embodiment, the first sheet 1 and the second sheet 2 are stacked in the Z-direction by using the sheet stacking apparatus 100 described above.

Figure 8:
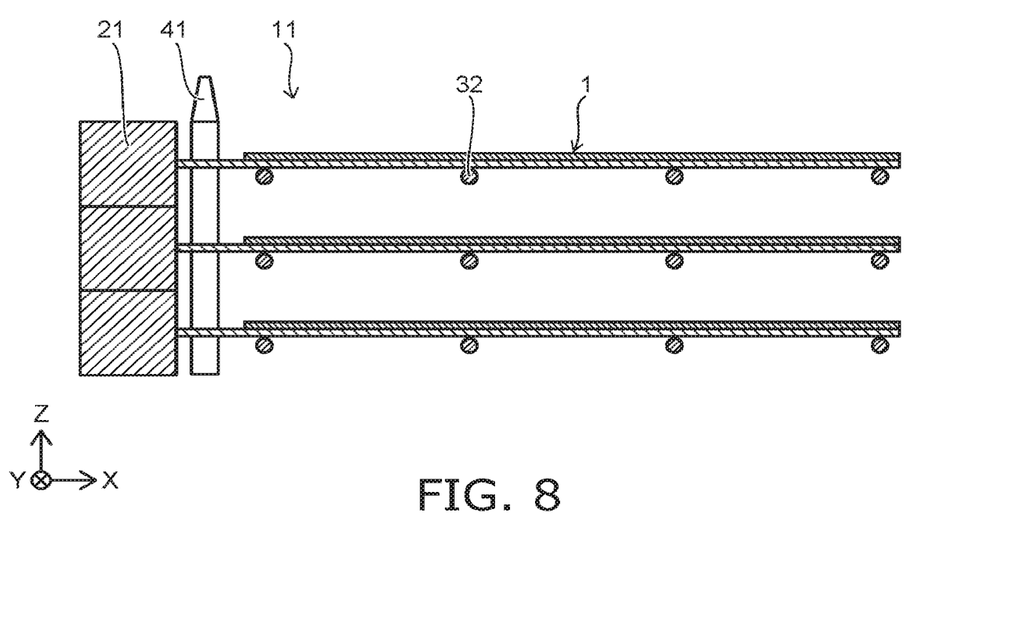
FIG. 8 is a descriptive view schematically illustrating a sheet stacking method according to the embodiment.

In the sheet stacking method according to the embodiment, first, as illustrated in FIG. 8, the first sheet 1 is disposed at the first holding part 21. In the example, the first sheets 1 are disposed respectively at the multiple first holding parts 21 of the first holder 11. The first sheet 1 is placed on the supporter 32 of the first holding part 21. By providing the first through-part 41 to pass through the first sheet 1, the movement of the first sheet 1 in the X-direction and the Y-direction is regulated; and the alignment of the first sheet 1 is performed.

At this time, as necessary, the sagging of the first sheet 1 may be eliminated by rotating the supporter 32 and/or by intaking into or exhausting from the intake/exhaust part 60. The elimination of the sagging may be performed each time the first sheet 1 is disposed, may be performed when multiple first sheets 1 are disposed, or may be performed after all of first sheets 1 are disposed.

Figure 9:
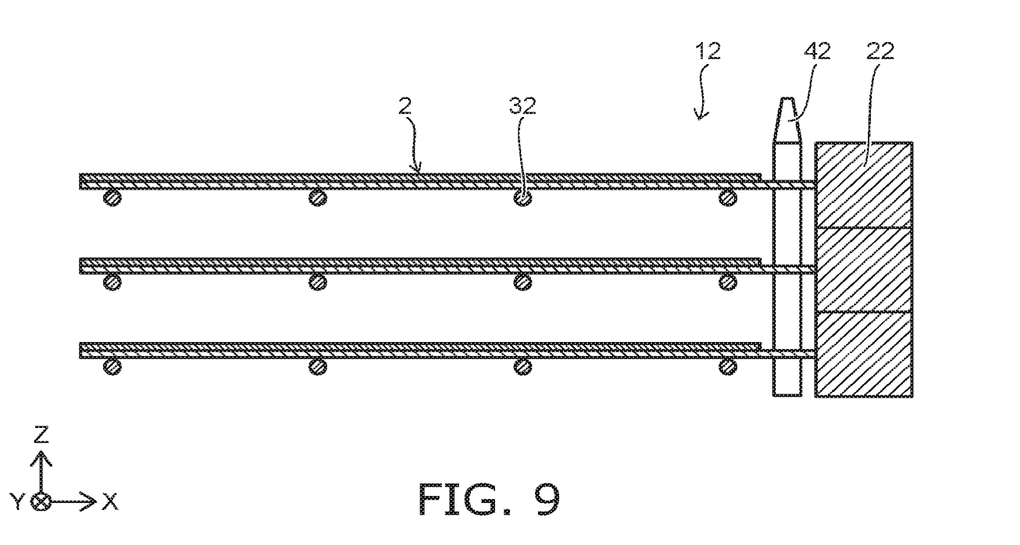
FIG. 9 is a descriptive view schematically illustrating a sheet stacking method according to the embodiment.

As illustrated in FIG. 9, the second sheet 2 is disposed at the second holding part 22. In the example, the second sheets 2 are disposed respectively at the multiple second holding parts 22 of the second holder 12. The second sheet 2 is placed on the supporter 32 of the second holding part 22. By providing the second through-part 42 to pass through the second sheet 2, the movement of the second sheet 2 in the X-direction and the Y-direction is regulated; and the alignment of the second sheet 2 is performed.

At this time, as necessary, the sagging of the second sheet 2 may be eliminated by rotating the supporter 32 and/or by intaking into or exhausting from the intake/exhaust part 60. The elimination of the sagging may be performed each time the second sheet 2 is disposed, may be performed when multiple second sheets 2 are disposed, or may be performed after all of second sheets 2 are disposed.

The process of disposing the second sheet 2 may be performed after the process of disposing the first sheet 1, may be performed before the process of disposing the first sheet 1, or may be performed simultaneously with the process of disposing the first sheet 1.

Figure 10:
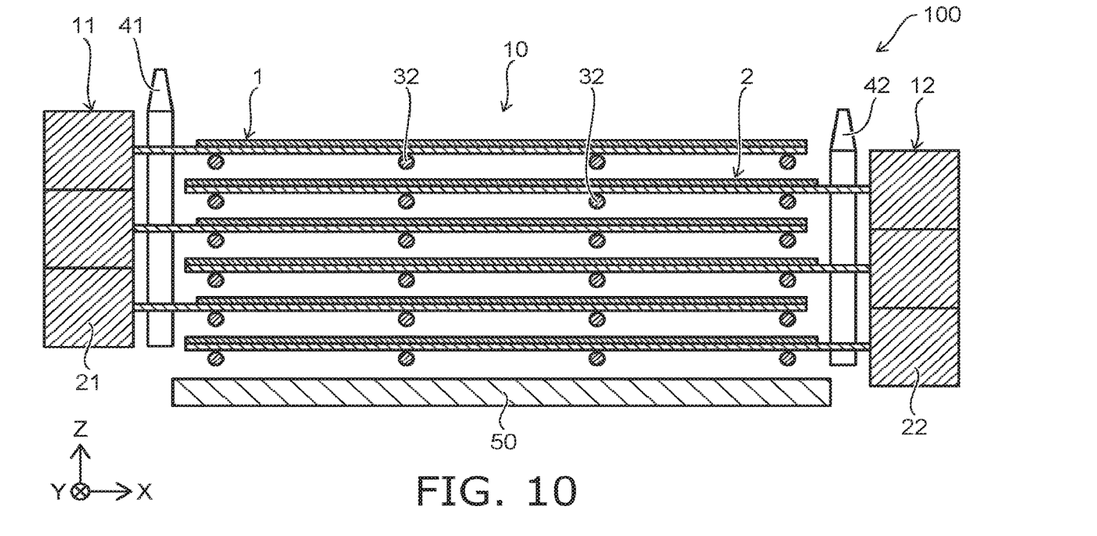
FIG. 10 is a descriptive view schematically illustrating a sheet stacking method according to the embodiment.

Then, as illustrated in FIG. 10, the holder 10 is assembled by combining the first holder 11 where the first sheet 1 is disposed and the second holder 12 where the second sheet 2 is disposed. At this time, the first holding part 21 and the second holding part 22 are disposed alternately in the Z-direction. The combination technique at this time is described below. The stage part 50 is provided below the holder 10. The sheet stacking apparatus 100 is assembled thereby.

Figure 11:
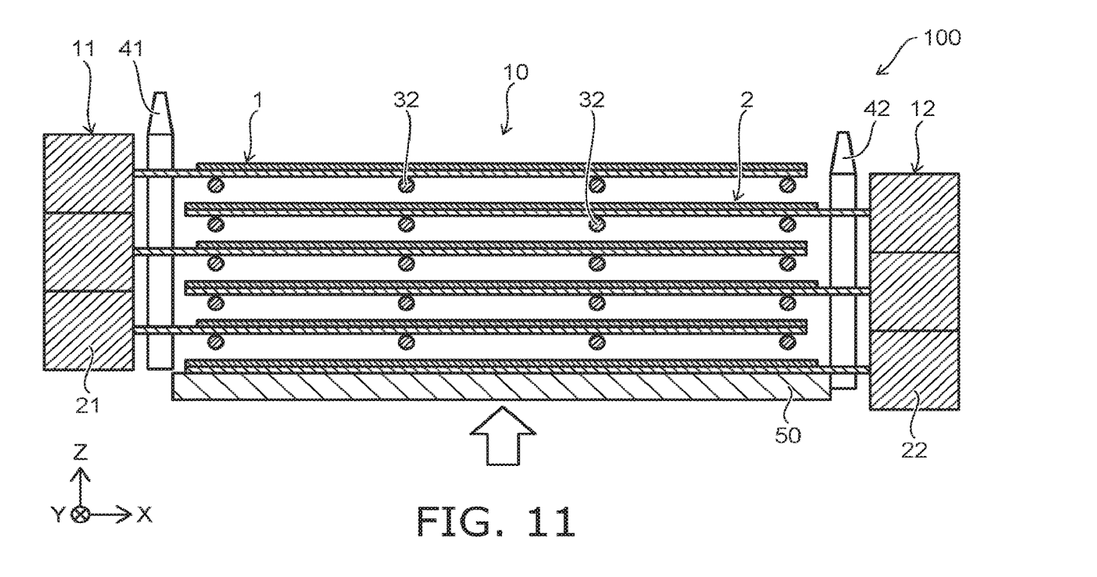
FIG. 11 is a descriptive view schematically illustrating a sheet stacking method according to the embodiment.
Figure 12:
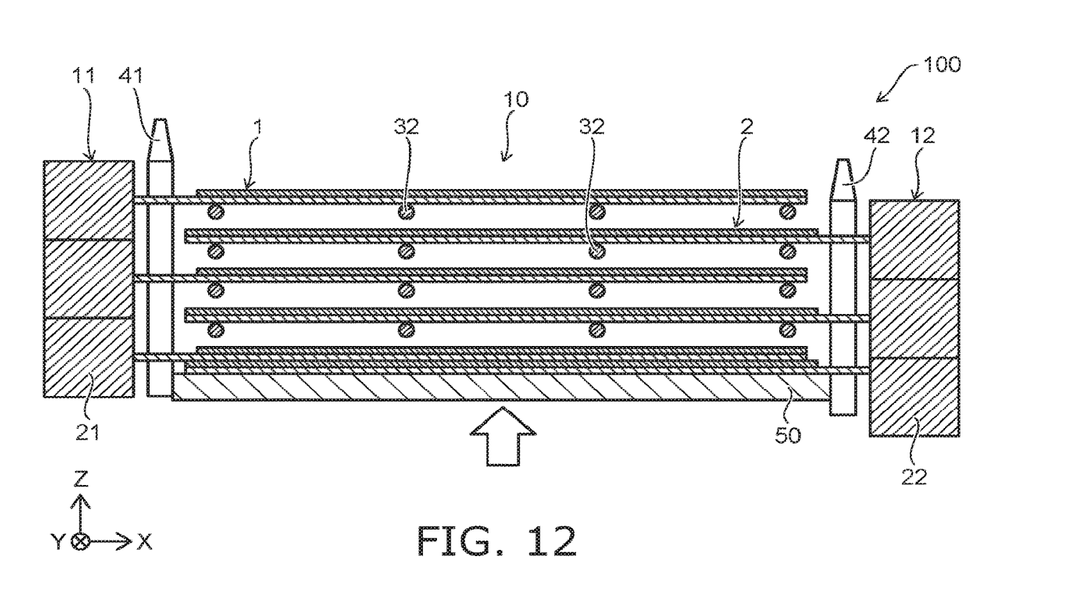
FIG. 12 is a descriptive view schematically illustrating a sheet stacking method according to the embodiment.
Figure 13:
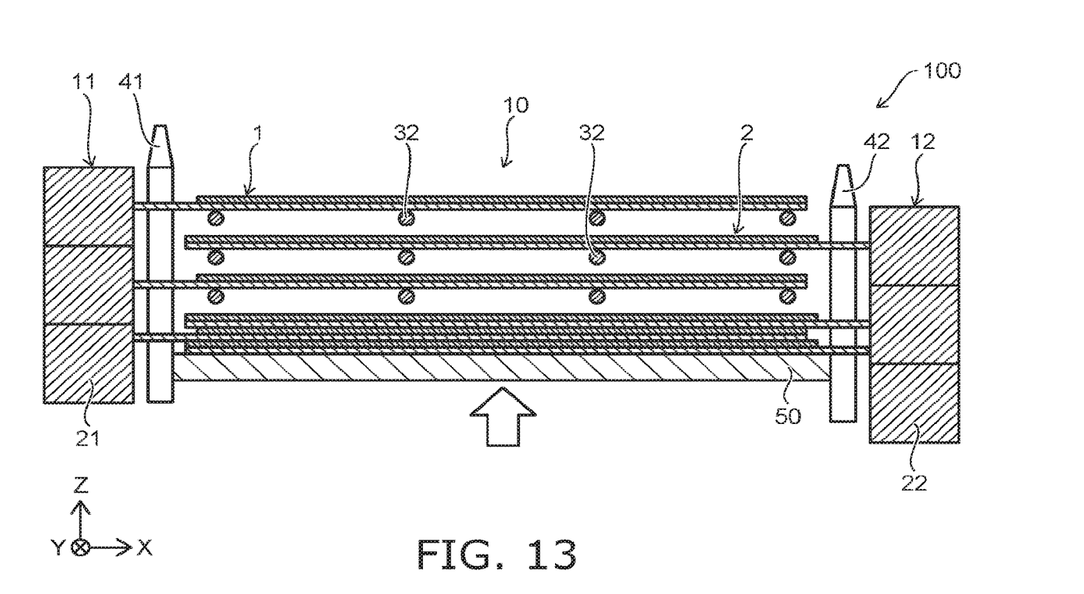
FIG. 13 is a descriptive view schematically illustrating a sheet stacking method according to the embodiment.
Figure 14:
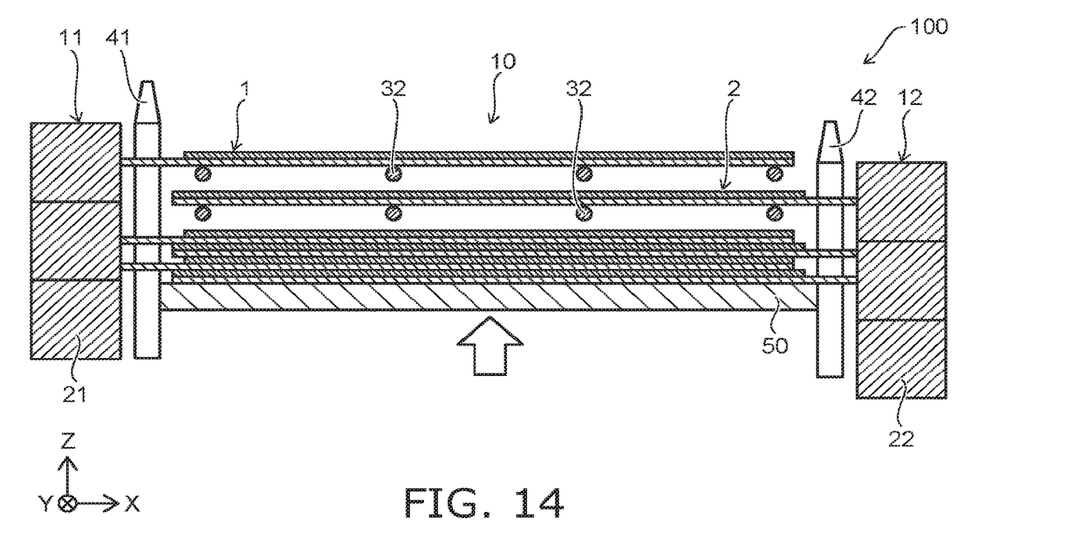
FIG. 14 is a descriptive view schematically illustrating a sheet stacking method according to the embodiment.
Figure 15:
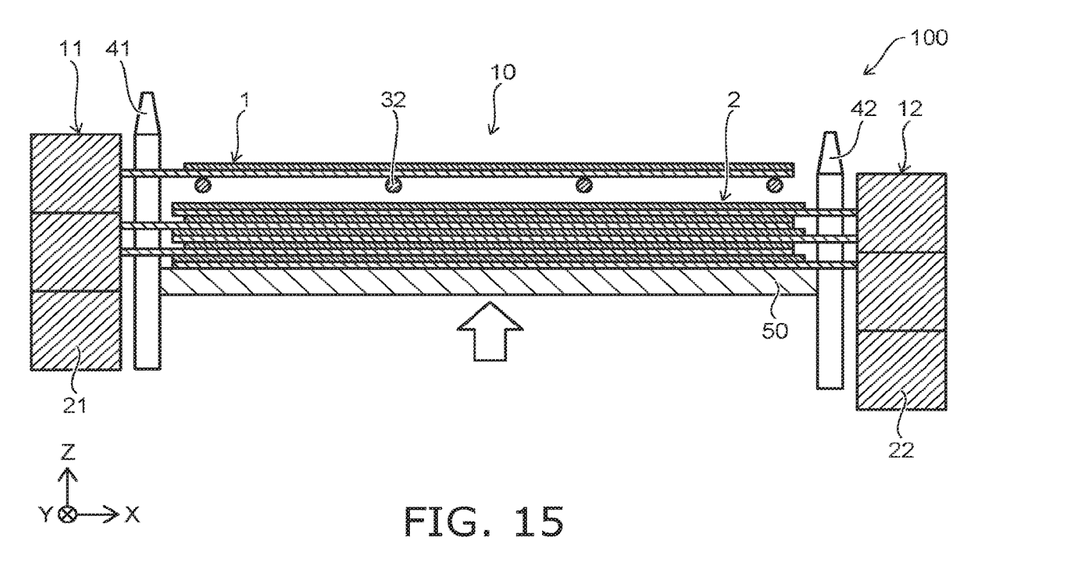
FIG. 15 is a descriptive view schematically illustrating a sheet stacking method according to the embodiment.
Figure 16:
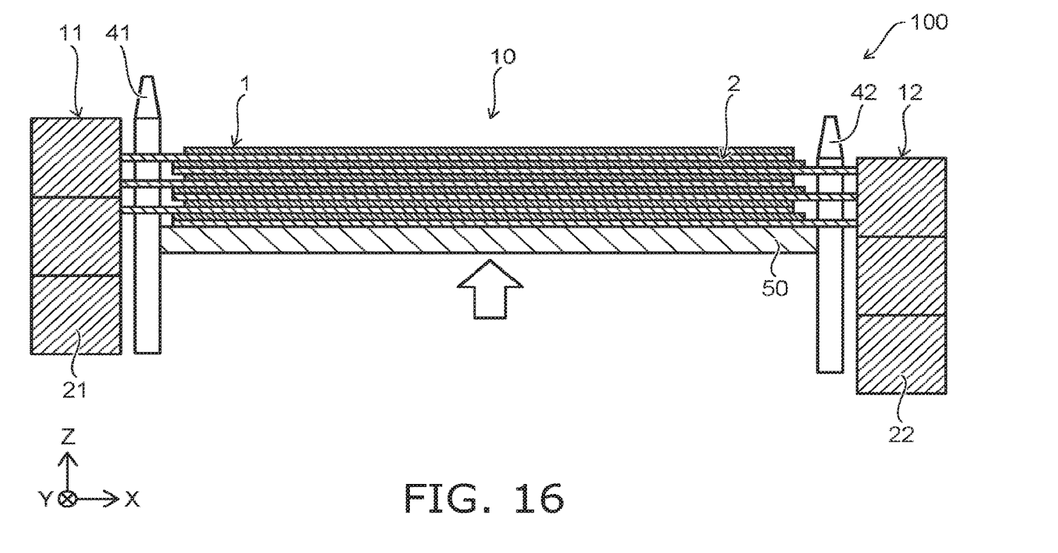
FIG. 16 is a descriptive view schematically illustrating a sheet stacking method according to the embodiment.

Then, as illustrated in FIG. 11 to FIG. 16, the objects are stacked by being dropped by moving the supporters 32 to positions not overlapping the objects in the Z-direction. More specifically, the first sheet 1 and the second sheet 2 are stacked alternately by being dropped onto the stage part 50 by alternately repeating the process of dropping the second sheet 2 by moving the supporter 32 of the second holding part 22 as illustrated in FIG. 11, FIG. 13, and FIG. 15 and the process of dropping the first sheet 1 by moving the supporter 32 of the first holding part 21 as illustrated in FIG. 12, FIG. 14, and FIG. 16.

In the embodiment, the misalignment in the horizontal direction when stacking the first sheet 1 and the second sheet 2 can be suppressed by alternately stacking the first sheet 1 aligned by the first holding part 21 and the second sheet 2 aligned by the second holding part 22.

At this time, for example, as illustrated in FIG. 11 to FIG. 16, the supporters 32 are moved in order of proximity to the stage part 50 (i.e., from below). At this time, the stage part 50 is moved upward as the first sheet 1 and the second sheet 2 are stacked. Thereby, the distances that the first sheet 1 and the second sheet 2 drop can be shorter; and the misalignment in the horizontal direction when stacking the first sheet 1 and the second sheet 2 can be suppressed further.

When the supporters 32 are moved (detached) to the positions not overlapping the object in the Z-direction, for example, the supporters 32 are moved in order of proximity to the through-part 40. More specifically, for the first holding part 21, the supporters 32 are moved in order of proximity to the first through-part 41; and for the second holding part 22, the supporters 32 are moved in order of proximity to the second through-part 42. The misalignment in the horizontal direction when stacking the first sheet 1 and the second sheet 2 can be suppressed further thereby.

FIG. 17A and FIG. 17B are descriptive views schematically illustrating the sheet stacking method according to the embodiment.

In the example as illustrated in FIG. 17A, the first through-part 41 of the first holder 11 and the second through-part 42 of the second holder 12 are positioned at different X-direction sides. By combining such a first holder 11 and such a second holder 12 in the X-direction, a holder 10 such as that illustrated in FIG. 17B can be assembled.

In the holder 10 after assembling, the first through-part and the second through-part 42 are positioned at the different X-direction sides of the holder 10. In other words, the first through-part 41 is positioned at one end side of the holder 10 in the X-direction; and the second through-part 42 is positioned at the other end side of the holder 10 in the X-direction. Thus, in the embodiment, the holder 10 can be assembled by combining the first holder 11 and the second holder 12 in the X-direction.

FIG. 18A and FIG. 18B are descriptive views schematically illustrating a modification of the sheet stacking method according to the embodiment.

In the example as illustrated in FIG. 18A, the first through-part 41 of the first holder 11 and the second through-part 42 of the second holder 12 are positioned at the same X-direction side of the holder 10. By combining such a first holder 11 and such a second holder 12 in the Y-direction, a holder 10 such as that illustrated in FIG. 18B can be assembled.

In the holder 10 after assembling, the first through-part 41 and the second through-part 42 are positioned at the same side of the holder 10 in the X-direction. In other words, the first through-part 41 and the second through-part 42 are positioned at one end side of the holder 10 in the X-direction. Thus, in the embodiment, the holder 10 may be assembled by combining the first holder 11 and the second holder 12 in the Y-direction.

According to the embodiments as described above, a sheet stacking apparatus and a sheet stacking method are provided in which the misalignment in the horizontal direction when stacking the sheets can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sheet stacking apparatus stacking a first sheet and a second sheet, the first sheet including a first stacked part and a first non-stacked part, the second sheet including a second stacked part and a second non-stacked part, the stacking causing the first stacked part and the second stacked part to align in a Z-direction aligned with the direction of gravity, the apparatus comprising:
a first holding part holding only one first sheet as an object; and
a second holding part holding only one second sheet as an object,
the first holding part and the second holding part each including
a frame part extending in an X-direction crossing the Z-direction, and
a supporter supporting the object in the Z-direction and being provided at the frame part,
the first holding part and the second holding part being respectively configured to hold the objects in a state in which movement of the objects in the X-direction is regulated,
the supporter being provided to be able to drop the object by releasing the supporting of the object in the Z-direction.

2. The apparatus according to claim 1, wherein
the apparatus comprises a plurality of the first holding parts and a plurality of the second holding parts, and
the apparatus is configured to have a first state in which the plurality of first holding parts and the plurality of second holding parts are separated from each other, and a second state in which the plurality of first holding parts and the plurality of second holding parts are combined to be disposed alternately in the Z-direction.

3. The apparatus according to claim 1, wherein the first holding part and the second holding part are respectively configured to hold the objects in a state in which movement of the objects in a Y-direction is regulated, the Y-direction crossing the Z-direction and the X-direction.

4. The apparatus according to claim 3, wherein
the supporter has a vertical surface spreading in the X-direction and the Z-direction, and
the vertical surface regulates the movement of the object in the Y-direction.

5. The apparatus according to claim 4, wherein the supporter has a plurality of the vertical surfaces oriented in different directions.

6. The apparatus according to claim 3, wherein
the first holding part and the second holding part each further include a through-part passing through the object in the Z-direction, and
the through-part regulates the movement of the object in the X-direction and the Y-direction.

7. The apparatus according to claim 6, wherein a plurality of the supporters is provided at positions aligned in the X-direction, and is moved, in order of proximity to the through-part, to positions not overlapping the object in the Z-direction.

8. The apparatus according to claim 1, wherein the supporter is inserted into a hole part provided in the frame part, and is configured to be rotatable with a center of the hole part as a central axis.

9. The apparatus according to claim 1, wherein
the supporter includes a first supporter and a second supporter,
the first supporter is movable in a first direction crossing the Z-direction, and
the second supporter is movable in a second direction different from the first direction.

10. The apparatus according to claim 1, further comprising a stage part where the first sheet and the second sheet are stacked.

11. The apparatus according to claim 1, further comprising an intake/exhaust part configured to intake or exhaust a gas.

12. A sheet stacking method, comprising:
disposing a first sheet at a first supporter of a first holding part, the first sheet including a first stacked part and a first non-stacked part;
disposing a second sheet at a second supporter of a second holding part, the second sheet including a second stacked part and a second non-stacked part;
alternately disposing the first holding part and the second holding part in a Z-direction aligned with the direction of gravity; and
stacking the first stacked part of the first sheet and the second stacked part of the second sheet to align in the Z-direction by dropping the first sheet and the second sheet by respectively releasing support by the first supporter and the second supporter of the first sheet and the second sheet.

* * * * *